US012801855B2

(12) United States Patent
Lopez Martinez

(10) Patent No.: US 12,801,855 B2
(45) Date of Patent: Nov. 17, 2026

(54) SYSTEMS FOR GENERATION OF PROMPTS FOR EVALUATION OF LANGUAGE MODELS

(71) Applicant: AMAZON TECHNOLOGIES, INC., Seattle, WA (US)

(72) Inventor: Daniel Lopez Martinez, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 190 days.

(21) Appl. No.: 18/736,763

(22) Filed: Jun. 7, 2024

(65) Prior Publication Data

US 2025/0378274 A1 Dec. 11, 2025

(51) Int. Cl.

| | |
|---|---|
| ***G06F 40/30*** | (2020.01) |
| ***G06F 40/56*** | (2020.01) |
| ***G10L 15/06*** | (2013.01) |
| ***G10L 15/16*** | (2006.01) |

(52) U.S. Cl.

CPC ............ *G06F 40/30* (2020.01); *G10L 15/063* (2013.01); *G06F 40/56* (2020.01); *G10L 15/16* (2013.01)

(58) Field of Classification Search

CPC ........... G10L 15/063; G10L 2015/0638; G10L 15/16; G10L 15/18; G06F 40/30; G06F 40/56

USPC ...................................................... 704/9, 232

See application file for complete search history.

(56) References Cited

U.S. PATENT DOCUMENTS

| | | | | |
|---|---|---|---|---|
| 11,580,145 | B1 * | 2/2023 | Kumar | G06N 3/092 |
| 2024/0296219 | A1 * | 9/2024 | Gardner | G06F 16/338 |
| 2025/0018298 | A1 * | 1/2025 | Dong | G06N 3/045 |
| 2025/0037710 | A1 * | 1/2025 | Yadav | G10L 15/1815 |
| 2025/0069617 | A1 * | 2/2025 | Carbune | G10L 15/183 |
| 2025/0156453 | A1 * | 5/2025 | Conway | G06F 40/30 |
| 2025/0209102 | A1 * | 6/2025 | Sato | G06Q 30/04 |
| 2025/0238347 | A1 * | 7/2025 | Sateli | G06F 9/451 |
| 2025/0356204 | A1 * | 11/2025 | Qu | G06N 3/091 |
| 2025/0363345 | A1 * | 11/2025 | Brown | G06N 3/08 |

(Continued)

OTHER PUBLICATIONS

Jung, Hoyoun, and Kyung-Joong Kim. "Discrete prompt compression with reinforcement learning." IEEE Access 12, May 2024, pp. 72578-72587. (Year: 2024).*

(Continued)

*Primary Examiner* — James S Wozniak
(74) *Attorney, Agent, or Firm* — Pierce Atwood LLP

(57) ABSTRACT

Synthetic prompts are generated for use with a language model by providing an initial prompt to a first machine learning model that is trained to determine modifications to the prompt having an increased probability of causing the language model to generate a response that violates a constraint. The first machine learning model may use a reward function that determines a reward value based on the text of the initial prompt, the modification, the text of the modified prompt, and one or more intervals of time, the reward value being associated with the probability of a response to the prompt deviating from a constraint. One or more additional machine learning models may determine scores based on characteristics of the prompts and responses generated in this manner, and rationales associated with the scores. The scores and rationales may be stored and used to affect future responses generated by the language model.

20 Claims, 5 Drawing Sheets

(56) References Cited

U.S. PATENT DOCUMENTS

2025/0371282 A1* 12/2025 Diesendruck ........... G06F 40/40
2025/0372090 A1* 12/2025 Cheng ..................... G10L 15/18

OTHER PUBLICATIONS

Rawte, Vipula, et al. "Sorry, Come Again?" Prompting—Enhancing Comprehension and Diminishing Hallucination with [Pause]-injected Optimal Paraphrasing. arXiv preprint arXiv:2403.18976, Mar. 2024, pp. 1-31. (Year: 2024).*

Wu, Xiefeng. "Enhancing Q-Learning with Large Language Model Heuristics." arXiv preprint arXiv:2405.03341, May 2024, pp. 1-21. (Year: 2024).*

Yao, Jia-Yu, et al. "Llm lies: Hallucinations are not bugs, but features as adversarial examples." arXiv preprint arXiv:2310.01469, Oct. 2023, pp. 1-13. (Year: 2023).*

"All-mpnet-base-v2 model card", Huggingface, Feb. 1, 2024, 11 pgs. Retrieved from the Internet: URL: https://huggingface.co/sentence-transformers/all-mpnet-base-v2.

"Claude 2", Anthropic PBC, Jul. 11, 2023, 7 pgs. Retrieved from the Internet: URL: https://www.anthropic.com/news/claude-2.

"Model Card and Evaluations for Claude Models", Anthropic, Jul. 2023, 14 pgs. Retrieved from the Internet: URL: https://www-cdn.anthropic.com/bd2a28d2535bfb0494cc8e2a3bf135d2e7523226/Model-Card-Claude-2.pdf.

Aggarwal, et al., "Entity-Controlled Synthetic Text Generation using Contextual Question and Answering with Pre-trained Language Models", 2022, 11 pgs. Retrieved from the Internet: URL: https://openreview.net/pdf? id=aDC4benblwL.

Arthur, et al., "k-means++: The Advantages of Careful Seeding", Stanford University, 2007, 9 pgs. Retrieved from the Internet: URL: https://theory.stanford.edu/~sergei/papers/kMeansPP-soda.pdf.

Askell, et al., "A general language assistant as a laboratory for alignment", Anthropic, Dec. 9, 2021, 48 pgs. Retrieved from the Internet: URL: https://arxiv.org/pdf/2112.00861.pdf.

Attenberg, et al., "Beat the Machine: Challenging Humans to Find a Predictive Model's Unknown Unknowns", Mar. 2015, 17 pgs. Retrieved from the Internet: URL: https://www.researchgate.net/publication/276856305_Beat_the_Machine.

Bai, et al., "Constitutional AI: Harmlessness from AI feedback", Anthropic, May 2, 2018, 34 pgs. Retrieved from the Internet: URL: https://arxiv.org/pdf/2212.08073.pdf.

Bai, et al., "Training a helpful and harmless assistant with reinforcement learning from human feedback", Anthropic, Apr. 12, 2022, 74 pgs. Retrieved from the Internet: URL: https://arxiv.org/pdf/2204.05862.pdf.

Bayer, et al., "A Survey on Data Augmentation for Text Classification", PEASEC, Technical University of Darmstadt, Jul. 2023, 44 pgs. Retrieved from the Internet: URL: https://arxiv.org/ftp/arxiv/papers/2107/2107.03158.pdf.

Bender, et al., "On the Dangers of Stochastic Parrots: Can Language Models Be Too Big?", Mar. 3-10, 2021, 14 pgs. Retrieved from the Internet: URL: https://s10251.pcdn.co/pdf/2021-bender-parrots.pdf.

Chan, et al., "ChatEval: Towards better LLM-based evaluators through Multi-Agent debate", Aug. 14, 2023, 16 pgs. Retrieved from the Internet: URL: https://arxiv.org/pdf/2308.07201.pdf.

Chen, et al., "Weakly Supervised Data Augmentation Through Prompting for Dialogue Understanding", Nov. 2, 2022, 17 pgs. Retrieved from the Internet: URL: https://arxiv.org/pdf/2210.14169.pdf.

Chung, et al., "Increasing diversity while 360 maintaining accuracy: Text data generation with large language models and human interventions", Jun. 7, 2023, 17 pgs. Retrieved from the Internet: URL: https://arxiv.org/pdf/2306.04140.pdf.

Fu, et al., "GPTScore: Evaluate as you desire", Feb. 13, 2023, 22 pgs. Retrieved from the Internet: URL: https://arxiv.org/pdf/2302.04166.pdf.

Ganduli, et al., "The capacity for moral Self-Correction in large language models", Anthropic, Feb. 18, 2023, 20 pgs. Retrieved from the Internet: URL: https://arxiv.org/pdf/2302.07459.pdf.

Ganguli, et al., "Red teaming language models to reduce harms: Methods, scaling behaviors, and lessons learned", Anthropic, Nov. 22, 2022, 30 pgs. Retrieved from the Internet: URL: https://arxiv.org/pdf/2209.07858.pdf.

Gao, et al., "Self-Guided Noise-Free data generation for efficient Zero-Shot learning", Feb. 26, 2023, 23 pgs. Retrieved from the Internet: URL: https://arxiv.org/pdf/2205.12679.pdf.

Glaese, et al., "Improving alignment of dialogue agents via targeted human judgements", DeepMind, Sep. 28, 2022, 77 pgs. Retrieved from the Internet: URL: https://arxiv.org/pdf/2209.14375.pdf.

Hartvigsen, et al., "Toxigen: A Large-Scale Machine-Generated Dataset for Adversarial and Implicit Hate Speech Detection", Jul. 14, 2022, 18 pgs. Retrieved from the Internet: URL: https://arxiv.org/pdf/2203.09509.pdf.

Jandaghi, et al., "Faithful Persona-based Conversational Dataset Generation with Large Language Models", Dec. 15, 2023, 25 pgs. Retrieved from the Internet: URL: https://arxiv.org/pdf/2312.10007.pdf.

Ji, et al., "Survey of Hallucination in Natural Language Generation", Center for Artificial Intelligence Research, Hong Kong University of Science and Technology, Feb. 19, 2024, 60 pgs. Retrieved from the Internet: URL: https://arxiv.org/pdf/2202.03629.pdf.

Kantorovich, et al., "Mathematical methods of organizing and planning production", Leningrad State University, Jul. 1939, 57 pgs. Retrieved from the Internet: URL: https://resistir.info/livros/kantorovich_mathematical_methods.pdf.

Kullback, et al., "On information and sufficiency", The George Washington University, Mar. 1951, 8 pgs. Retrieved from the Internet: URL: https://projecteuclid.org/journals/annals-of-mathematical-statistics/volume-22/issue-1/On-Information-and-Sufficiency/10.1214/aoms/1177729694.full.

Kumar, et al., "Data Augmentation Using Pre-trained Transformer Models", Amazon, Jan. 31, 2021, 9 pgs. Retrieved from the Internet: URL: https://arxiv.org/pdf/2003.02245.pdf.

Lazaridou, et al., "Mind the gap: Assessing temporal generalization in neural language models", DeepMind, Oct. 26, 2021, 20 pgs. Retrieved from the Internet: URL: https://arxiv.org/pdf/2102.01951.pdf.

Lee, et al., "PERSONACHATGEN: Generating personalized dialogues using GPT-3", Proceedings of the 29th International Conference on Computational Linguistic, Oct. 12-17, 2022, 20 pgs. Retrieved from the Internet: URL: https://aclanthology.org/2022.ccgpk-1.4.pdf.

Li, et al., "Synthetic Data Generation with Large Language Models for Text Classification: Potential and Limitations", Oct. 13, 2023, 18 pgs. Retrieved from the Internet: URL: https://arxiv.org/pdf/2310.07849.pdf.

Liu, et al., "Calibrating LLM-Based evaluator", Sep. 23, 2023, 22 pgs. Retrieved from the Internet: URL: https://arxiv.org/pdf/2309.13308.pdf.

Liu, et al., "G-EVAL: NLG Evaluation using GPT-4 with Better Human Alignment", Microsoft Cognitive Services Research, May 23, 2023, 11 pgs. Retrieved from the Internet: URL: https://arxiv.org/pdf/2303.16634.pdf.

Lloyd, S., "Least squares quantization in PCM", Bell Laboratories, May 1, 1981, 9 pgs. Retrieved from the Internet: URL: http://mlsp.cs.cmu.edu/courses/fall2010/class14/lloyd.pdf.

Massey, et al., "Development of personas to communicate Narrative-Based information about the HPV vaccine on twitter", Aug. 2021, 11 pgs. Retrieved from the Internet: URL: https://www.frontiersin.org/journals/digital-health/articles/10.3389/fdgth.2021.682639/full.

Mehta, et al., "Amazon announces Rufus, a new generative AI-powered conversational shopping experience", Amazon, Feb. 1, 2024, 6 pgs. Retrieved from the Internet: URL: https://www.aboutamazon.com/news/retail/amazon-rufus.

Meng, et al., "Generating Training Data with Language Models: Towards Zero-Shot Language Understanding", Department of Computer Science, University of Illinois at Urbana-Champaign, Oct. 12, 2022, 19 pgs. Retrieved from the Internet: URL: https://arxiv.org/pdf/2202.04538.pdf.

(56) References Cited

OTHER PUBLICATIONS

Paik, et al., "Maximum Mean Discrepancy Meets Neural Networks: The Radon-Kolmogorov-Smirnov Test", Nov. 6, 2023, 36 pgs. Retrieved from the Internet: URL: https://arxiv.org/pdf/2309.02422.pdf.
Park, et al., "Generative Agents: Interactive Simulacra of Human Behavior", Aug. 6, 2023, 22 pgs. Retrieved from the Internet: URL: https://arxiv.org/pdf/2304.03442.pdf.
Perez, et al., "Discovering Language Model Behaviors with Model-Written Evaluations", Dec. 19, 2022, 47 pgs. Retrieved from the Internet: URL: https://arxiv.org/pdf/2212.09251.pdf.
Perez, et al., "Red Teaming Language Models with Language Models", Feb. 7, 2022, 31 pgs. Retrieved from the Internet: URL: https://arxiv.org/pdf/2202.03286.pdf.
Pruitt, et al., "Personas: Practice and Theory", Microsoft Corporation, Microsoft Research, Jun. 2023, 8 pgs. Retrieved from the Internet: URL: https://www.microsoft.com/en-us/research/wp-content/uploads/2017/03/pruitt-grudinold.pdf.
Radharapu, et al., "AART: AI-Assisted 339 Red-Teaming with diverse data generation for new LLM-powered applications", Google Research, Nov. 29, 2023, 16 pgs. Retrieved from the Internet: URL: https://arxiv.org/pdf/2311.08592.pdf.
Reif, et al., "Visualizing Linguistic Diversity of Text Datasets Synthesized by Large Language Models", Google Research, Sep. 27, 2023, 5 pgs. Retrieved from the Internet: URL: https://arxiv.org/pdf/2305.11364.pdf.
Reimers, et al., "Sentence-BERT: Sentence Embeddings using Siamese BERT-Networks", Ubiquitous Knowledge Processing Lab (UKP-TUDA)Department of Computer Science, Technische Universitat Darmstadt, Aug. 27, 2019, 11 pgs. Retrieved from the Internet: URL: https://arxiv.org/pdf/1908.10084.pdf.
Rousseeuw, et al., "graphical aid to the interpretation and validation of cluster analysis", The University of Fribourg, Nov. 1986, 13 pgs. Retrieved from the Internet: URL: https://www.sciencedirect.com/science/article/pii/0377042787901257?via%3Dihub.
Rozen, et al., "Answering Product—Questions by utilizing questions from other contextually similar products", May 19, 2021, 12 pgs. Retrieved from the Internet: URL: https://arxiv.org/pdf/2105.08956.pdf.
Sahu, et al., "Data Augmentation for Intent Classification with Off-the-shelf Large Language Models", ServiceNow Research, Apr. 5, 2022, 11 pgs. Retrieved from the Internet: URL: https://arxiv.org/pdf/2204.01959.pdf.
Schopke-Gonzalez, et al., "Why do volunteer content moderators quit? Burnout, conflict, and harmful behaviors", University of Michigan, Dec. 2022, 55 pgs. Retrieved from the Internet: URL: https://journals.sagepub.com/doi/full/10.1177/14614448221138529.
Shelby, et al., "Sociotechnical Harms of Algorithmic Systems: Scoping a Taxonomy for Harm Reduction", Jul. 19, 2023, 19 pgs. Retrieved from the Internet: URL: https://arxiv.org/pdf/2210.05791.pdf.
Shinn, et al., "Reflexion: Language Agents with Verbal Reinforcement Learning", Oct. 10, 2023, 19 pgs. Retrieved from the Internet: URL: https://arxiv.org/pdf/2303.11366.pdf.
Steiger, et al., "The Psychological Well-Being of Content Moderators, The Emotional Labor of Commercial Moderation and Avenues for Improving Support", May 8-13, 2021, 14 pgs. Retrieved from the Internet: URL: https://crowd.cs.vt.edu/wp-content/uploads/2021/02/CHI21_final _The_Psychological_Well_Being_of_Content_Moderators-2.pdf.
Van Pinxteren, et al., "Human-like communication in conversational agents: a literature review and research agenda", Jan. 22, 2020, 23 pgs. Retrieved from the Internet: URL: https://www.emerald.com/insight/content/doi/10.1108/JOSM-06-2019-0175/full/pdf.
Viswanathan, et al., "Large language models enable Few-Shot clustering.", Jul. 2, 2023, 12 pgs. Retrieved from the Internet: URL: https://arxiv.org/pdf/2307.00524.pdf.
Wang, et al., "Is ChatGPT a good NLG evaluator? a preliminary study", Oct. 24, 2023, 11 pgs. Retrieved from the Internet: URL: https://arxiv.org/pdf/2303.04048.pdf.
Wang, et al., "Towards Zero-Label Language Learning", Google, Sep. 19, 2021, 14 pgs. Retrieved from the Internet: URL: https://arxiv.org/pdf/2109.09193.pdf.
Weidinger, et al., "Ethical and social risks of harm from Language Models", Dec. 8, 2021, 64 pgs. Retrieved from the Internet: URL: https://arxiv.org/pdf/2112.04359.pdf.
Wen, et al., "Unveiling the Implicit Toxicity in Large Language Models", Nov. 29, 2023, 17 pgs. Retrieved from the Internet: URL: https://arxiv.org/pdf/2311.17391.pdf.
Xu, et al., "Recipes for Safety in Open-domain Chatbots", Facebook AI Research, Aug. 4, 2021, 28 pgs. Retrieved from the Internet: URL: https://arxiv.org/pdf/2010.07079.pdf.
Ye, et al., "ZEROGEN: Efficient Zero-shot Learning via Dataset Generation", Oct. 22, 2022, 17 pgs. Retrieved from the Internet: URL: https://arxiv.org/pdf/2202.07922.pdf.
Yoo, et al., "GPT3Mix: Leveraging Large-scale Language Models for Text Augmentation", Naver Corp., Nov. 18, 2021, 15 pgs. Retrieved from the Internet: URL: https://arxiv.org/pdf/2104.08826.pdf.
Zhang, et al., "Supporting clustering with contrastive learning", Amazon, May 28, 2021, 12 pgs. Retrieved from the Internet: URL: https://arxiv.org/pdf/2103.12953.pdf.
Zhong, et al., "Towards a unified Multi-Dimensional evaluator for text generation", Oct. 13, 2022, 16 pgs. Retrieved from the Internet: URL: https://arxiv.org/pdf/2210.07197.pdf.

* cited by examiner

SYSTEMS FOR GENERATION OF PROMPTS FOR EVALUATION OF LANGUAGE MODELS

BACKGROUND

Large language models (LLMs) and other types of machine learning models may be trained to determine output text in response to input text, and in some cases other types of inputs. The responses generated by a language model may be controlled using a set of constraints to prevent presentation of unsafe, inaccurate, inconsistent, or otherwise undesirable output. Testing and evaluation of language models to discover types of inputs that may cause outputs to violate a constraint may include generation of synthetic inputs using computing devices. However, existing methods for generation of synthetic inputs are unlikely to produce a large number of inputs that cause a language model to generate outputs that violate a constraint, limiting the ability to identify and address errors or possible points of failure for a language model.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
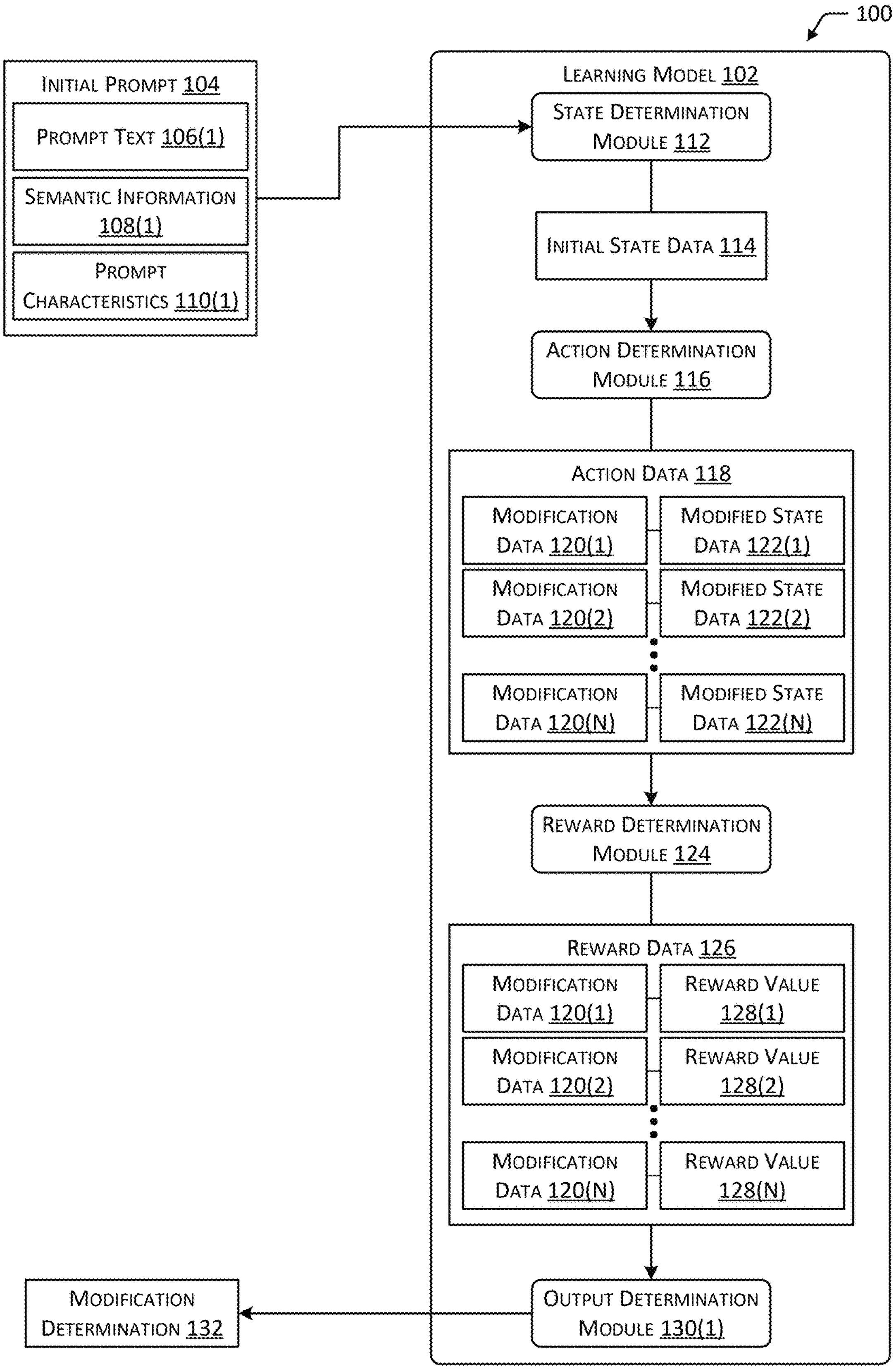
FIG. 1 is a diagram depicting an implementation of a system for using a learning model to determine modifications to prompts that may cause a language model to determine an output that deviates from a constraint.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A language model may include a probabilistic model or a neural-network that may be trained to receive an input, such as a query or other instructional prompt that includes text in a natural human language, and determine a response to the input. For example, one type of language model may include a large language model (LLM) that is trained to determine a textual response to a query or instructional prompt. The language model may be provided with a body of text relating to one or more subjects, which may be encoded to form a representation of the language domain used by the language model. For example, words, characters, sub-words (e.g., groups of characters), groups of words, and so forth may be represented as tokens, vector embeddings, or other types of representations. Continuing the example, a language model may determine a representation of a particular word based on the text included in the word and semantic information associated with the word, such as other words that occur in proximity to the particular word within the body of text. When a language model is provided with a query or other type of input, the input may be encoded to generate a representation of the input, and an output that is responsive to the input may be generated based on the parameters of the trained language model and the body of data that was provided to the model.

Typically, a language model includes a set of constraints to prevent presentation of undesired output, such as content that may be inaccurate, inconsistent, illegal or offensive in one or more locations, and so forth. For example, a language model may be constrained from use of certain words, or the generation of responses that meet certain characteristics, such as providing medical advice or diagnoses. Before deploying a language model for general use, the language model may be tested, and outputs from the language model evaluated, to determine whether any outputs of the language model deviate from one or more constraints and the characteristics of prompts that may cause such a deviation. In some cases, a language model may be tested by human users, who may provide inputs to the model to attempt to cause the model to output responses that violate one or more constraints. However, this manual testing process is not usable to produce large quantities of inputs without using a significant quantity of time and a significant number of users. Additionally, manual testing processes are subject to human error, fatigue, the limits of human creativity, and may expose the human users to inappropriate outputs.

Language models may also be tested using synthetic (e.g., artificial) inputs generated using one or more computing devices. For example, multiple prompts or queries may be generated based on a single input or set of inputs generated by a human user, or other parameters provided by a human user. However, the synthetic inputs that are generated may not necessarily cause a language model to output responses that deviate from a constraint, or the inputs that cause the model to output responses that deviate from a constraint may be small in number and insufficient for determining modifications to the model to prevent future deviations.

Described in this disclosure are techniques for generation of inputs for a language model or other type of machine learning model, that have an increased probability of causing the model to determine an output that deviates from a constraint. To increase the probability that a generated prompt may cause a language model to determine an output that deviates from a constraint, a first machine learning model, which in some implementations may include a learning algorithm, such as a Q-learning model, may be used to determine a modification to an initial prompt. For example, a Q-learning model may be trained using training data that includes a set of prompts, each prompt being associated with an indication of whether the prompt caused a language model to determine a response that deviated from a constraint. The Q-learning model may be trained to maximize a reward value for a reward function that is based on an initial state, an action, a second state, and one or more intervals of time. The reward value may represent a probability that a modified prompt will cause a language model to determine an output that violates a constraint. Continuing the example, an initial prompt may include text having various characteristics, such as words, characters, semantic information, tone (e.g., casual or professional), and so forth. Possible modifications to the initial prompt may include changing the words or tone of the prompt, such as by modifying the initial prompt to have a tone similar to that of a young person presenting the prompt, or modifying the initial prompt to add additional contextual information. The initial prompt may represent a first state, a modification to the initial prompt may represent an action, and the modified prompt may represent a second state. A Q-learning model may be trained to maximize a reward function that is determined based on an expected sum of future rewards, as indicated in Equation 1 below:

$$Q^{new}(S_t, A_t) = (1 - \propto)\cdot Q(S_t, A_t) + \propto \cdot \left(R_{t+1} + \gamma \cdot \max_a Q(S_{t+1}, a)\right) \qquad \text{EQUATION 1}$$

In Equation 1, Q represents a quality value for a combination of a given state S and action A. The variable $\propto$ represents the learning rate, while the variable $\gamma$ represents a discount factor (e.g., a number between 0 and 1) that may control the effect of earlier and later rewards, such as by associating a greater weight with future rewards and a lesser weight with earlier rewards. As such, the quality value $Q^{new}(S_t, A_t)$ may be the sum of three factors: $(1-\propto)\cdot Q(S_t, A_t)$, the current value weighted by one minus the learning rate; $\propto R_{t+1}$, the reward value obtained if the action $A_t$ is taken when the state is $S_t$, weighted by the learning rate; and $$\propto \gamma \cdot \max_a Q(S_{t+1}, a),$$

the maximum rewards that can be obtained from the state $S_{t+1}$, weighted by the learning rate and discount factor.

Use of a learning algorithm, which in some implementations may include a model-free reinforcement learning algorithm such as Q-learning, to determine modified prompts that are generated based on a set of initial prompts may cause a larger portion of the modified prompts that are generated to violate constraints of the language model, enabling the model to be more efficiently modified to correct for these possible errors. In some implementations, the generation of modified prompts may be controlled at least in part using verbal reflexion techniques. For example, a set of initial prompts associated with a language model may be divided into sets based on text, semantic information, and other characteristics associated with the prompts, such as through use of a clustering algorithm. For example, clusters of prompts may represent queries having similar characteristics associated with a persona, such as a professional tone, a tone similar to that of a child, and so forth. Modified prompts may then be generated having similar semantic information and characteristics to those of a selected cluster of prompts, in some implementations with the characteristic selected based on the modifications determined using a Q-learning model or similar algorithm.

Generated prompts, and in some cases responses to the generated prompts, may be scored using an additional machine learning model based on various characteristics such as fluency, consistency, coherence, tone, diversity, and so forth. In some implementations, an additional machine learning model may use the generated prompt and associated score to determine a rationale for the score. The score and rationale may be stored and used as data to control subsequent generation of prompts.

Implementations described herein may therefore increase the portion of generated inputs, created through verbal reflexion or a similar process, that are likely to cause a machine learning model to generate an output that deviates from a constraint. Increasing the number of inputs that cause such outputs to be determined may enable the machine learning model to be efficiently modified to account for prompts having characteristics that may cause such an output, which may prevent the presentation of undesired content. In contrast, conventional techniques such as use of human users to generate prompts to test or evaluate a model may be impractical when generating a large number of prompts, while generation of synthetic inputs at scale may not necessarily result in the generation of a significant number of inputs that cause an output of a model to deviate from a constraint.

FIG. 1 is a diagram 100 depicting an implementation of a system for using a learning model 102 to determine modifications to prompts that may cause a language model to determine an output that deviates from a constraint. For example, the learning model 102 may be trained using training data that includes a set of prompts, each prompt being associated with an indication of whether the prompt caused a language model to determine a response that deviated from a constraint. In some implementations, the learning model 102 may include a Q-learning model that is trained to maximize a value for a reward function that is based on an initial state, an action, a second state, and one or more intervals of time, as described with regard to Equation 1 above. The value associated with the reward function may represent a probability that a modified prompt will cause a language model to determine an output that violates a constraint. The learning model 102 may be stored and executed using one or more computing devices, such as servers, personal computing devices, portable computing devices, and so forth.

One or more initial prompts 104 may be provided to the learning model 102. An initial prompt 104 may be input by a human user, determined using one or more machine learning models, or accessed from data storage accessible to the learning model 102. The initial prompt 104 may include prompt text 106(1), such as one or more words, sub-words, characters, groups of words, groups of characters, and so forth. For example, the prompt text 106(1) may include a question or instructional prompt intended to be provided to a language model to cause the language model to generate an answer that is responsive to the question or prompt. The initial prompt 104 may also include semantic information 108(1). The semantic information 108(1) may include the proximity of words to other words, the presence of punctuation, capitalization, and so forth. For example, a language model may determine relationships between prompts and responses based on the proximity of particular words to other words within a body of language data provided to the language model. An initial prompt 104 may also be associated with prompt characteristics 110(1), such as a tone associated with the prompt (e.g., professional, casual, similar to a child), a length associated with the prompt, a location associated with the prompt, the presence or absence of particular words or contextual information, and so forth. The prompt characteristics 110(1) of a particular prompt may affect the responses that a language model determines based on the prompt. For example, if a first prompt has a professional tone while a second prompt includes a similar question but with a tone similar to that of a child, a response to the first prompt may differ from a response to the second prompt. As another example, if a first prompt includes a single question, while a second prompt includes a similar question accompanied by additional contextual information, a response to the first prompt may differ from a response to the second prompt.

A state determination module 112 associated with the learning model 102 may determine initial state data 114 based on the initial prompt 104. For example, the learning model 102 may include a Q-learning model in which the initial prompt 104 represents a first state, a modification to the initial prompt 104 represents an action, and the resulting modified prompt represents a second state. As described previously, a Q-learning model may be trained to maximize a value associated with a reward function, the value representing a probability that the modified prompt, when provided to a language model, will result in an output that deviates from a constraint. The initial state data 114 may therefore represent the prompt text 106(1), semantic information 108(1), and prompt characteristics 110(1) of the initial prompt 104. For example, the initial state data 114 may include one or more tokens, vector embeddings, or other representations of the initial prompt 104. Continuing the example, in some implementations, the state determination module 112 may determine the initial state data 114 based on the initial prompt 104 using one or more encoders.

An action determination module 116 associated with the learning model 102 may determine action data 118 based on the initial state data 114. As described previously, the learning model 102 may be trained to determine modifications to prompts that have an increased probability of causing a language model to determine an output that deviates from a constraint. As such, the action data 118 may represent one or more possible modifications to the initial prompt 104 that result in a modified prompt. For example, a modification may include changing the tone associated with the initial prompt 104, adding text describing additional context to the initial prompt 104, removing text that describes context from the initial prompt 104, adding or removing particular words, changing the order in which words or groups of words are presented, and so forth. FIG. 1 depicts the action data 118 including first modification data 120(1) that represents a possible modification to the initial prompt 104, associated with first modified state data 122(1) that represents a modified prompt based on the initial prompt 104 and the modification, second modification data 120(2) associated with second modified state data 122(2), and any number of additional modification data 120(N) each associated with a respective modified state data 122(N).

A reward determination module 124 associated with the learning model 102 may determine reward data 126 that associates a reward value 128 with at least a subset of the modifications represented by the action data 118. For example, as described previously, in some implementations, the learning model 102 may be trained to determine reward values 128 based on a reward function. Continuing the example, a reward function may be used to determine a reward value 128 based on a relationship between a first state, such as the initial prompt 104, an action, such as a modification represented by modification data 120, and a second state, such as a modified prompt represented by modified state data 122. In some cases, the reward function may also determine the reward value 128 based on one or more intervals of time, such as through use of a discount factor as described with regard to Equation 1. In some cases, the learning model 102 may be trained to maximize the reward value 128, such as by determining a modification associated with a greatest reward value 128, which would represent a modification associated with a maximum probability that the resulting prompt will cause a language model to determine an output that deviates from a constraint. For example, FIG. 1 depicts the reward data 126 associating the first modification data 120(1) with a first reward value 128(1), the second modification data 120(2) with a second reward value 128(2), and any number of additional modification data 120(N) with corresponding respective reward values 128(N). While FIG. 1 conceptually depicts the action determination module 116 and reward determination module 124 as discrete components, in some implementations, the learning model 102 may determine a particular modification or set of modifications to the initial prompt 104 that is associated with the greatest reward value 128 or set of rewards values 128 in a single operation.

An output determination module 130(1) associated with the learning model 102 may determine an output, such as a modification determination 132, based on the reward data 126. The modification determination 132 may represent a modification to the initial prompt 104, a modified prompt that is determined based on the initial prompt 104 and the modification, or combinations thereof. For example, the learning model 102 may output one or more modifications that may be used to generate subsequent prompts based on the initial prompt 104. In other cases, the learning model 102 may generate modified prompts based on the determined modifications and the reward data 126. In some implementations, the modification determination 132 may be provided as an input to a subsequent machine learning model that may be used to generate prompts for input to a language model based on the initial prompt 104 and the modification determination 132.

Figure 2:
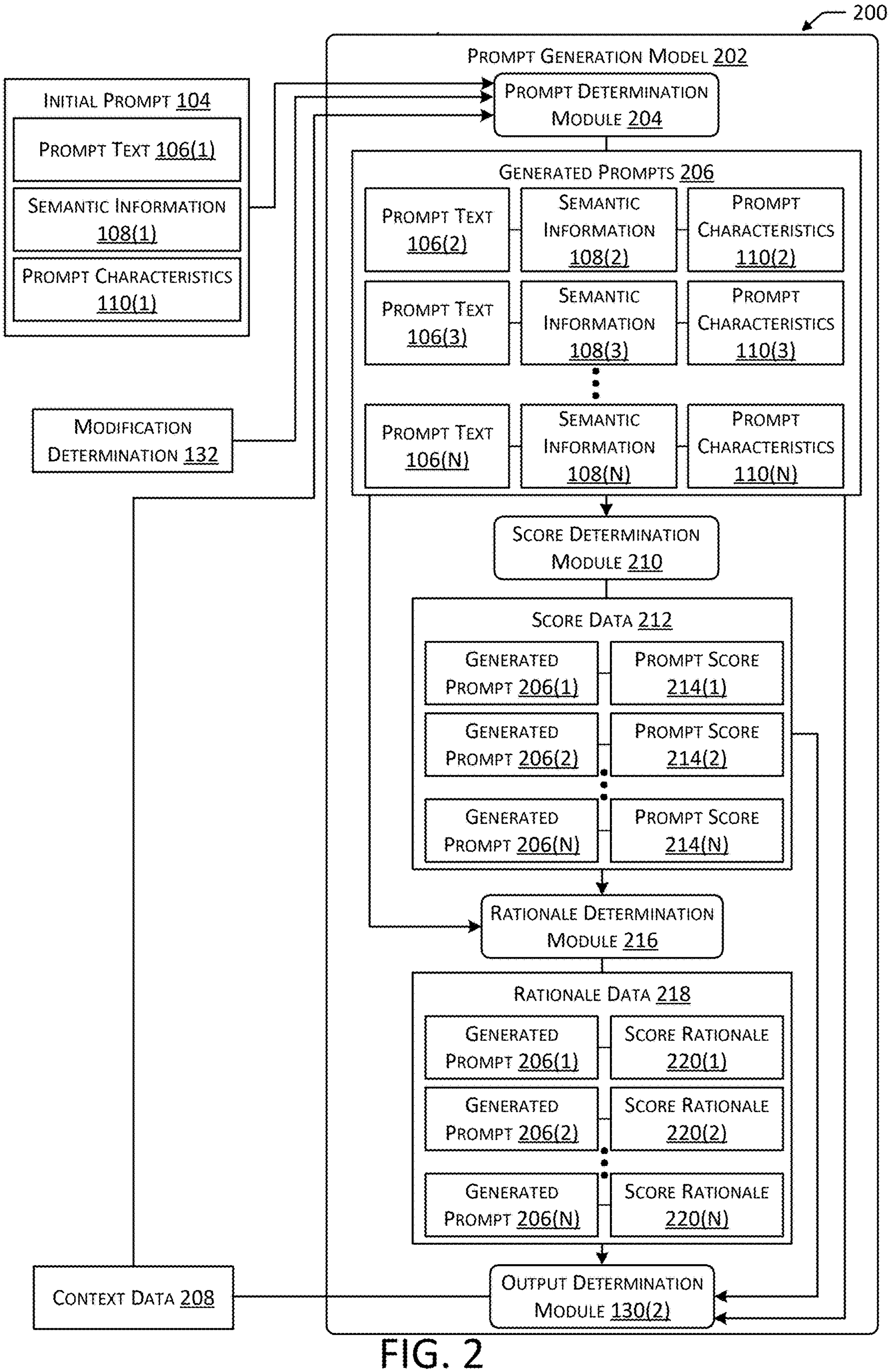
FIG. 2 is a diagram depicting an implementation of a system for generating prompts based on a determined modification, and determining scores and rationales associated with the generated prompts to affect subsequent generation of prompts.

FIG. 2 is a diagram 200 depicting an implementation of a system for generating prompts based on a determined modification, and determining scores and rationales associated with the generated prompts to affect subsequent generation of prompts. As described with regard to FIG. 1, an initial prompt 104 may be provided as an input to a learning model 102, which may determine a modification determination 132 indicative of one or more modifications to the initial prompt 104 that may be associated with generation, by a language model, of a response that deviates from one or more constraints. A prompt generation model 202 may be trained to generate prompts for use as inputs to the language model. For example, the prompt generation model 202 may be trained to use an initial prompt 104 and a modification determination 132 as inputs to generate a set of modified prompts to be provided to a language model. Training of the prompt generation model 202 may cause the prompt generation model 202 to determine prompts with text, semantic characteristics, syntax, context, and so forth that are able to be processed by the language model. The prompt generation model 202 may be stored and executed using one or more computing devices including, without limitation, the types of computing devices described with regard to the learning model 102. In some implementations, the prompt generation model 202 and learning model 102 may be associated with the same computing device(s). In other implementations, the prompt generation model 202 and learning model 102 may be associated with different computing devices.

A prompt determination module 204 associated with the prompt generation model 202 may determine one or more generated prompts 206 based on the initial prompt 104 and the modification determination 132. For example, the modification determination 132 may indicate one or more modifications to the initial prompt 104, such as a change in the tone or another prompt characteristic 110(1) associated the initial prompt 104, one or more changes to the prompt text 106(1) such as the addition of contextual information, one or more changes to the semantic information 108(1), and so forth. For a particular modification, multiple possible prompts may be generated. For example, the text, semantic characteristics, tone, and other prompt characteristics 110 of an initial prompt 104 may be modified in various ways to determine a generated prompt 206. As such, each generated prompt 206 may include prompt text 106, semantic information 108, and prompt characteristics 110, one or more of which may differ from the initial prompt 104. For example, FIG. 2 depicts the generated prompts 206 including a first generated prompt 206 represented by second prompt text 106(2), second semantic information 108(2), and second prompt characteristics 110(2), a second generated prompt 206 represented by third prompt text 106(3), third semantic information 108(3), and third prompt characteristics 110(3), and any number of additional generated prompts 206 represented by prompt text 106(N), semantic information 108(N), and prompt characteristics 110(N).

In some implementations, the prompt determination module 204 may be trained to generate prompts having diverse prompt text 106, semantic information 108, and prompt characteristics 110, independent of the modification determination 132. For example, in some cases, only a subset of the generated prompts 206 may result in an output that deviates from a constraint when provided to a language model. However, generation of prompts based at least in part on the modification determination 132 may result in a larger portion of the generated prompts 206 resulting in an output that deviates from a constraint when compared to generation of prompts in the absence of a modification determination 132 from a learning model 102.

In some implementations, the prompt generation model 202 may be configured to determine scores based on one or more generated prompts 206, and in some cases rationales associated with the scores, which may be used to determine context data 208 that may affect subsequent prompts generated using the prompt generation model 202. For example, a score determination module 210 associated with the prompt generation model 202 may determine score data 212 based on at least a subset of the generated prompts 206. While FIG. 2 depicts the score determination module 210 as a component of the prompt generation model 202, in other implementations, the score determination module 210 may be associated with a different machine learning model that may be stored and executed using the same computing devices as the prompt generation model 202, or different computing devices. The score determination module 210 may be trained to determine scores based on characteristics of generated prompts 206, such as fluency, consistency, coherence, tone, diversity, and so forth. For example, the score determination module 210 may be provided with annotated training data that associates prompts with one or more score values for various metrics. FIG. 2 depicts the score data 212 associating a first generated prompt 206(1) with a first prompt score 214(1), which may represent a single score value or multiple score values associated with different metrics of the first generated prompt 206(1), a second generated prompt 206(2) with a second prompt score 214(2), and any number of additional generated prompts 206(N) with corresponding prompt scores 214(N).

A rationale determination module 216 associated with the prompt generation model 202 may determine rationale data 218 that represents rationales for determination of a prompt score 214 with regard to a corresponding generated prompt 206. While FIG. 2 depicts the rational determination module 216 as a component of the prompt generation model 202, in other implementations, the rationale determination module 216 may be associated with a different machine learning model that may be stored and executed using the same computing devices as the prompt generation model 202, or different computing devices. In some cases, the rationale determination module 216 and score determination module 210 may be associated with the same machine learning model. In other implementations, the rationale determination module 216 and score determination module 210 may be associated with different machine learning models. The rationale determination module 216 may be trained to determine a rationale associated with a generated prompt 206 and corresponding prompt score 214. For example, the rationale determination module 216 may be trained using training data that associates rationales with corresponding sets of scores and characteristics of prompts. Continuing the example, the rationale data 218 may be determined based in part on correlations between characteristics of prompts and scores associated with the prompts. FIG. 2 depicts the rationale data 218 associating a first generated prompt 206(1) with a first score rationale 220(1), a second generated prompt 206(2) with a second score rationale 220(2), and any number of additional generated prompts 206(N) with corresponding score rationales 220(N).

An output determination module 130(2) associated with the prompt generation model 202 may determine context data 208 based on the score data 212 and the rationale data 218. Context data 208 may associate characteristics of generated prompts 206 with corresponding prompt scores 214 and score rationales 220. The subsequent prompts generated using the prompt determination model 202 may be affected by the context data 208. For example, based on the context data 208, the prompt generation model 202 may have a greater probability of determining generated prompts 206 having characteristics associated with greater prompt scores 214 based on the prompt scores 214 and score rationales 220 indicated in the context data 208. While FIG. 2 depicts the output determination module 130(2) determining context data 208 based in part on the score data 212 and rationale data 218, in some implementations, determination of one or both of score data 212 and rationale data 218 may be omitted, and the determined output may be based on the generated prompts 206.

Figure 3:
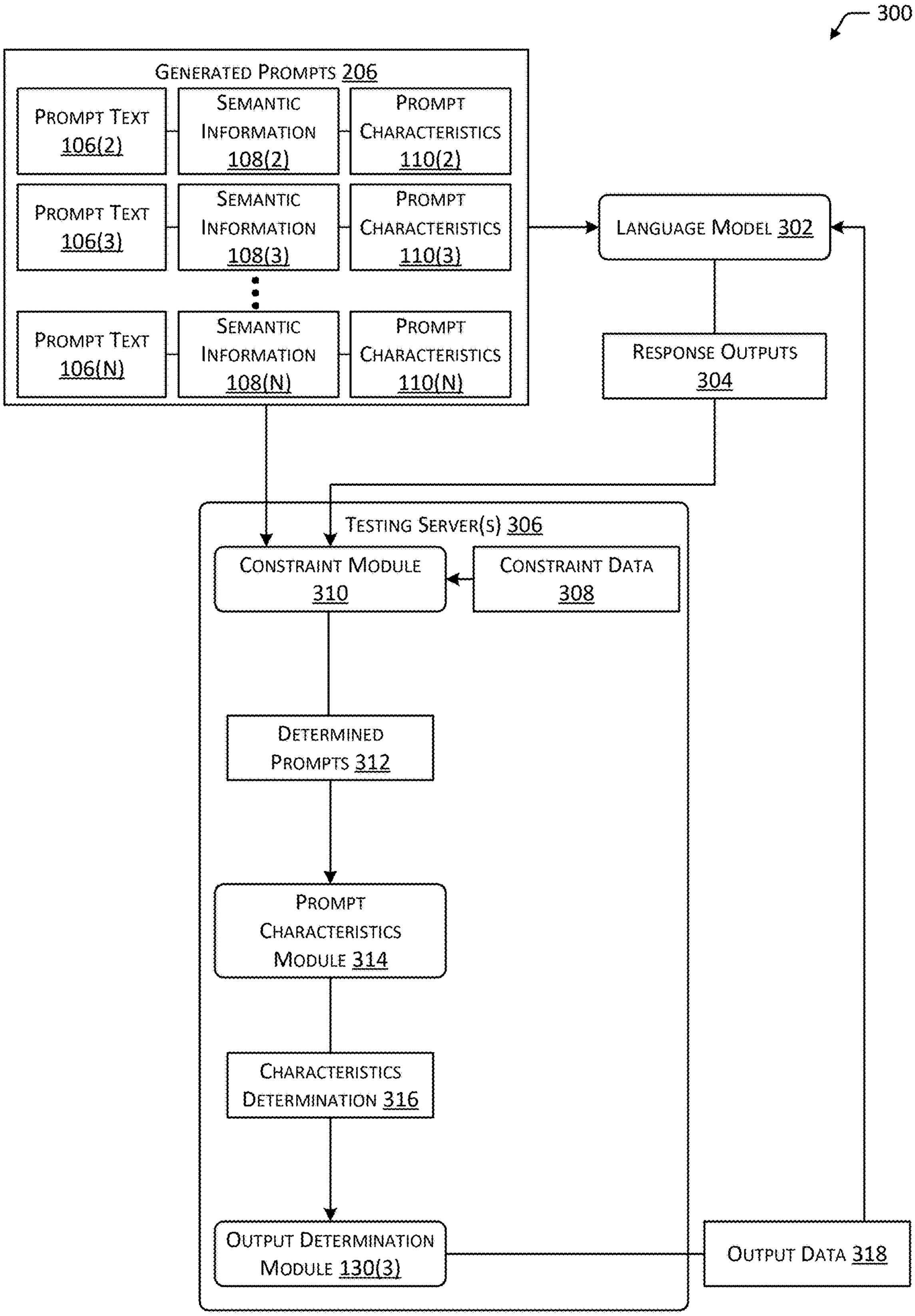
FIG. 3 is a diagram depicting an implementation of a system for providing generated prompts to a language model, determining outputs from the language model that deviate from a constraint, and the characteristics of prompts associated with the determined outputs.

FIG. 3 is a diagram 300 depicting an implementation of a system for providing generated prompts 206 to a language model 302, determining outputs from the language model 302 that deviate from a constraint, and the characteristics of prompts associated with the determined outputs. As described previously, the prompts generated using the prompt generation model 202 may be used as inputs to a language model 302, such as to test or evaluate the language model 302. For example, prompts having certain characteristics may cause the language model 302 to determine an output that deviates from a constraint, such as a response that is inaccurate, inconsistent, unsafe, offensive or illegal in certain geographic areas, or otherwise undesirable. Generation of prompts based on the modification determination 132 determined using a learning model 102 may have an increased probability of causing the language model 302 to determine an output that deviates from a constraint, which may enable the language model 302 to be modified to account for prompts having characteristics that may cause an undesired output more efficiently.

The language model 302 may determine one or more response outputs 304 based on the generated prompts 206. For example, a language model 302 may be trained to determine output text based on the prompt text 106, semantic information 108, and prompt characteristics 110 of a generated prompt 206, such as a response to a question or instructional prompt. The language model 302 may be provided with a corpus of text that may be encoded and used to determine responses to prompts. For example, a generated prompt 206 may be encoded to determine a vector representation or other type of representation that represents the prompt text 106 and semantic information 108, and the language model 302 may determine a response output 304 based in part on a relationship between the representation of the generated prompt 206 and the encoded corpus of text.

One or more testing servers 306 may access the response outputs 304 and determine correspondence between the response outputs 304 and constraint data 308 that represents one or more constraints associated with outputs of the language model 302. While FIG. 3 depicts the language model 302 as a separate component from the learning model 102, prompt generation model 202, and testing servers 306, in other implementations, the language model 302 may be associated with one or more of the learning model 102, prompt generation model 202, or testing servers 306. The language model 302 may be stored and executed using one or more computing devices including, without limitation, the types of computing devices described with regard to the learning model 102 and prompt generation model 202. In some implementations, the language model 302 may be stored and executed using the same computing device(s) as one or more of the learning model 102 or prompt generation model 202. In other implementations, the language model 302 may be stored and executed using one or more different computing devices. Additionally, while FIG. 3 depicts the testing server(s) 306 as a separate component from the learning model 102, prompt generation model 202, and language model 302, in other implementations, the testing server(s) 306 may store and execute one or more of the learning model 102, prompt generation model 202, and language model 302. While the testing server(s) 306 are described as servers, in other implementations, the testing server(s) 306 may include one or more other types of computing devices including, without limitation, the types of computing devices described with regard to the learning model 102, prompt generation model 202, and language model 302.

A constraint module 310 associated with the testing server(s) 306 may determine correspondence between the response outputs 304 of the language model 302 and the constraint data 308. For example, the constraint module 310 may determine a set of determined prompts 312 that deviate from one or more constraints represented by the constraint data 308. In other implementations, the constraint data 308 may represent one or more sets of characteristics of a response output 304 or generated prompt 206 other than a constraint associated with the language model 302, and the constraint module 310 may be configured to determine a set of determined prompts 312 that are associated with those characteristics, or deviate from those characteristics.

A prompt characteristics module 314 associated with the testing server(s) 306 may determine a characteristics determination 316 based on the determined prompts 312. The characteristics determination 316 may represent one or more characteristics of the prompts that caused the language model 302 to determine a response output 304 that deviated from a constraint. In some implementations, the prompt characteristics module 314 may use one or more clustering algorithms to determine sets of prompts having identical or similar characteristics.

An output determination module 130(3) may determine output data 318 based on the characteristics determination 316. The output data 318 may be provided to the language model 302 as additional contextual text that may be used to determine responses, as training data to change one or more parameters of the language model 302, or as additional constraints for the language model 302. In other implementations, the output data 318 may be used to manually change one or more parameters, constraints, or components of the language model 302. Thus, while FIG. 3 depicts the output data 318 provided to the language model 302, in some implementations, the output data 318 may not be provided to the language model 302 but may instead be provided to a human user or one or more other computing devices, which may determine one or more modifications to the language model 302 or constraint data 308 that may reduce the probability of a response of the language model 302 violating a constraint.

Figure 4:
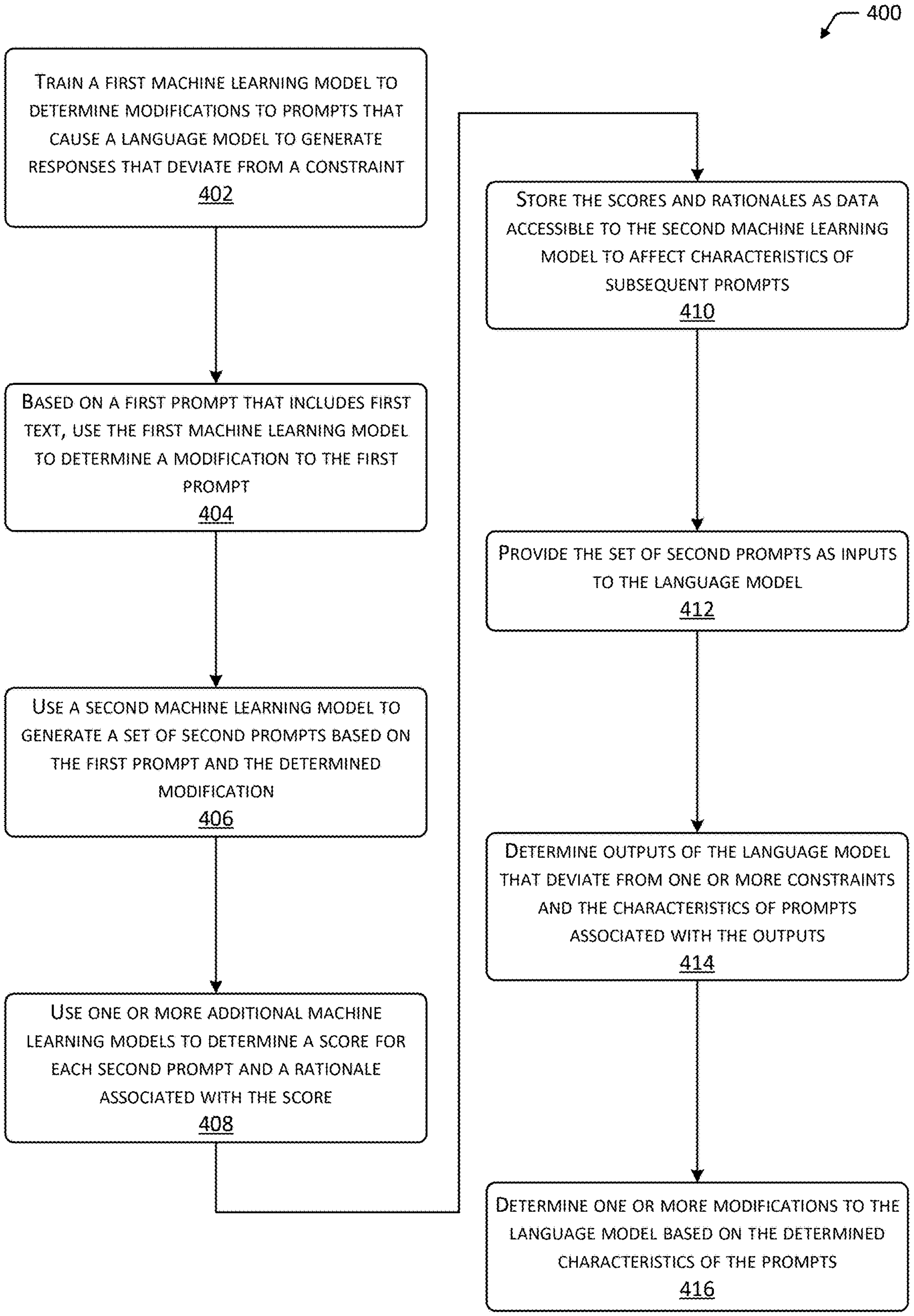
FIG. 4 is a flow diagram depicting an implementation of a method for generating prompts using a machine learning model that is trained to determine prompts that cause a language model to generate responses that deviate from a constraint.

FIG. 4 is a flow diagram 400 depicting an implementation of a method for generating prompts using a machine learning model that is trained to determine prompts that cause a language model 302 to generate responses that deviate from a constraint. At 402, a first machine learning model may be trained to determine modifications to prompts that cause a language model 302 to generate responses that deviate from a constraint. For example, the first machine learning model may include a Q-learning model or other type of learning model 102 that may be trained using training data that includes a set of prompts, each prompt being associated with an indication of whether the prompt caused a language model 302 to determine a response that deviated from a constraint. In some implementations, the learning model 102 may be trained to maximize a value for a reward function that is based on an initial state, an action, a second state, and one or more intervals of time, as described with regard to Equation 1 and FIG. 1 above. The value associated with the reward function may represent a probability that a modified prompt will cause a language model 302 to determine an output that violates a constraint.

At 404, based on a first prompt that includes first text, the first machine learning model may be used to determine a modification to the first prompt. As described previously, the first machine learning model may be trained to determine an output that includes one or more modifications based on an input that includes a prompt. For example, as described with regard to FIG. 1, a modification determination 132 indicative of one or more modifications to an initial prompt 104 may be determined based on a set of reward values 128, each reward value 128 determined based in part on a corresponding modification to the initial prompt 104.

At 406, a second machine learning model may be used to generate a second set of prompts based on the first prompt and the determined modification. For example, as described with regard to FIG. 2, a prompt generation model 202 may generate one or more generated prompts 206 based on an initial prompt 104 and a modification determination 132. Continuing the example, the second machine learning model may be trained to use an initial prompt 104 and a modification determination 132 as inputs to generate a set of modified prompts to be provided to a language model 302.

At 408, one or more additional machine learning models may be used to determine a score for each second prompt and a rationale associated with the score. For example, as described with regard to FIG. 2, score data 212 may be determined based on at least a subset of generated prompts 206. Continuing the example, a score determination module 210 may be trained using training data that associates prompts with one or more score values for various metrics. The score(s) determined for a prompt may be indicative of one or more metrics, such as fluency, consistency, coherence, tone, diversity, and so forth. Based on the score data 212 and the characteristics of a generated prompt 206, rationale data 218 may be determined that represents rationales for determination of a prompt score 214 with regard to a corresponding generated prompt 206. For example, a rationale determination module 216 may be trained using training data that associates rationales with corresponding sets of scores and characteristics of prompts.

At 410, the scores and rationales may be stored as data accessible to the second machine learning model to affect characteristics of subsequent prompts. For example, as described with regard to FIG. 2, scores and rationales may be stored as context data 208, such that subsequent prompts that are generated may be affected by the context data 208. Subsequent prompts may therefore have characteristics associated with greater scores.

At 412, the set of second prompts may be provided as inputs to the language model 302. As described with regard to FIG. 3, a language model 302 may determine response outputs 304 based on generated prompts 206. For example, a language model 302 may be trained to determine output text based on the prompt text 106, semantic information 108, and prompt characteristics 110 of a generated prompt 206, and may be provided with a corpus of text usable as contextual data when determining responses to prompts. While FIG. 4 depicts an implementation of a process that includes both determination of a score and determination of a rationale, in other implementations, determining a score, determining a rationale, or determining both a score and a rationale may be omitted.

At 414, outputs of the language model 302 that deviate from one or more constraints, and the characteristics of prompts associated with the outputs, may be determined. For example, inclusion of a particular characteristic or combination of characteristics in a prompt may increase the probability that a language model 302 determines an output that deviates from a constraint. As described with regard to FIG. 3, one or more testing servers 306 may be used to determine characteristics that are common to prompts that cause the language model 302 to determine an output that deviates from a constraint. In some cases, a clustering algorithm or other technique may be used to determine sets of prompts having identical or similar characteristics.

At 416, one or more modifications to the language model 302 may be determined based on the determined characteristics of the prompts. For example, data indicative of the characteristics of the prompts may be used by the language model 302 as contextual text to determine responses, training data to change one or more parameters of the language model 302, or as additional constraints. In other implementations, data indicative of the characteristics of the prompts may be used to manually change one or more parameters, constraints, or components of the language model 302.

Figure 5:
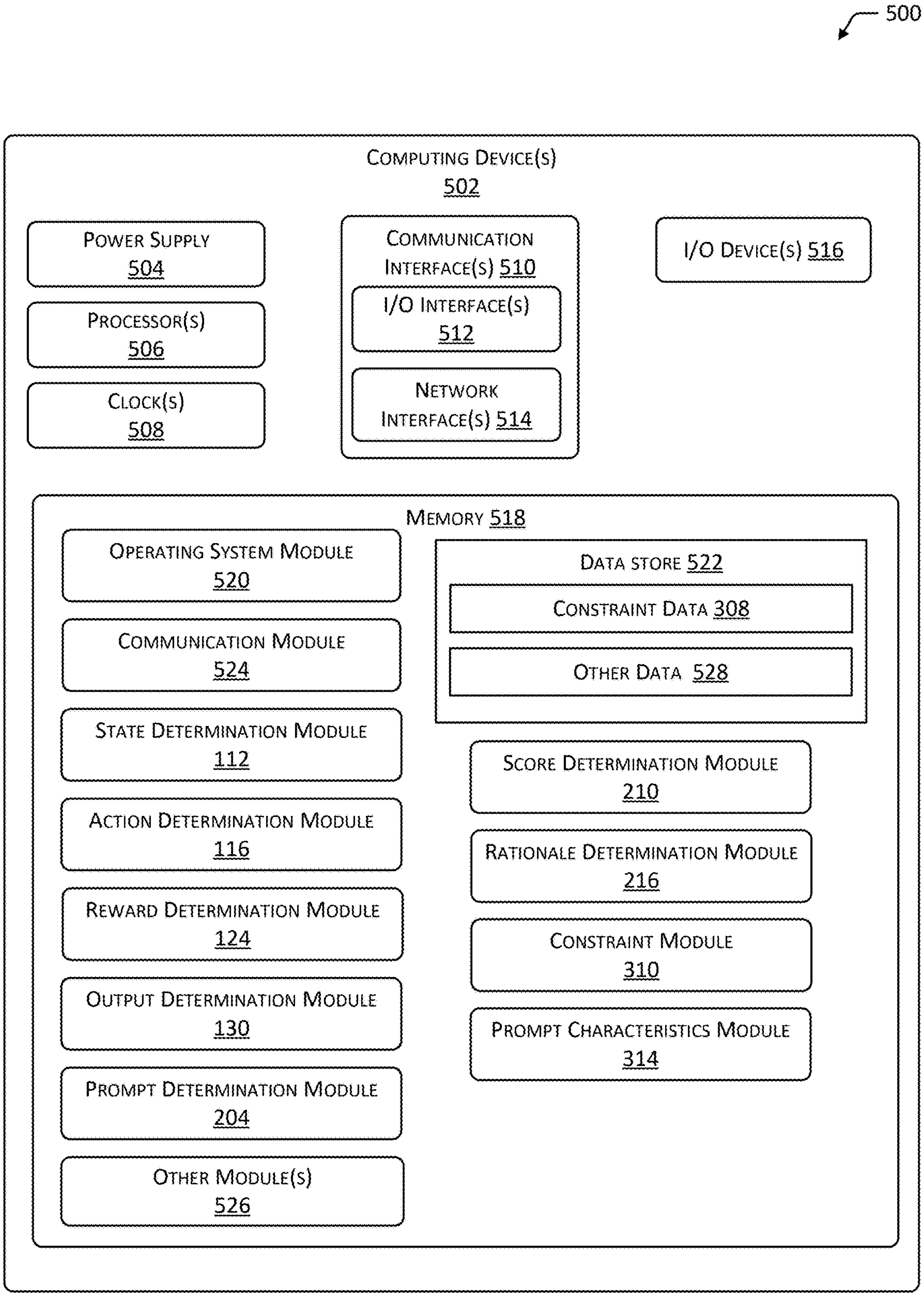
FIG. 5 is a block diagram depicting an implementation of a computing device within the present disclosure.

FIG. 5 is a block diagram 500 depicting an implementation of a computing device 502 within the present disclosure. The computing device 502 may include one or multiple computing devices that store data and control operations of the learning model 102, prompt generation model 202, testing servers 306, and in some implementations the language model 302. Any number and any type of computing devices 502 may be used. For example, different computing devices 502 may store and execute different models, different computing devices 502 may be used to train or tune machine learning models, and so forth. Thus, while FIG. 5 depicts a single block diagram 500, the computing device 502 may include any number and any type of computing devices including, without limitation, one or more servers, personal computing devices, portable computing devices, network-accessible data storage devices, and so forth.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 5G, LTE, and so forth.

The computing device 502 may include one or more buses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices 502, network attached storage devices, and so forth.

A communication module 524 may be configured to establish communications with one or more other computing devices 502. Communications may be authenticated, encrypted, and so forth.

The memory 518 may additionally store the state determination module 112. The state determination module 112 may determine initial state data 114 based on an initial prompt 104. For example, a learning model 102, such as a Q-learning model, may determine modifications to an initial prompt 104 based on a first state (the initial prompt 104), an action (a modification to the initial prompt 104), and in some cases a second state (a modified prompt). Continuing the example, a Q-learning model may be trained to maximize a value associated with a reward function, the value representing a probability that the modified prompt, when provided to a language model 302, will result in an output that deviates from a constraint.

The memory 518 may store the action determination module 116. The action determination module 116 may determine action data 118 based on initial state data 114. For example, a learning model 102 may be trained to determine modifications to prompts that have an increased probability of causing a language model 302 to determine an output that deviates from a constraint. Action data 118 may represent one or more possible modifications to an initial prompt 104, that result in a modified prompt. A modification may include changing the tone associated with the initial prompt 104, adding text describing additional context to the initial prompt 104, removing text that describes context from the initial prompt 104, adding or removing particular words, changing the order in which words or groups of words are presented, and so forth.

The memory 518 may also store the reward determination module 124. The reward determination module 124 may determine reward data 126 that associates a reward value 128 with at least a subset of the modifications determined using the action determination module 116. For example, a learning model 102 may be trained to determine reward values 128 based on a reward function. The reward function may be used to determine a reward value 128 based on a relationship between a first state, such as an initial prompt 104, an action, such as a modification to the initial prompt 104, and a second state, such as a modified prompt. In some implementations, the reward function may also determine the reward value 128 based on one or more intervals of time, such as through use of a discount factor as described with regard to Equation 1. For example, a modification associated with a greatest reward value 128, may represent a modification associated with a maximum probability that the resulting prompt will cause a language model 302 to determine an output that deviates from a constraint.

The memory 518 may additionally store the prompt determination module 204. The prompt determination module 204 may determine one or more generated prompts 206 based on an initial prompt 104 and a modification determination 132. For example, a modification determination 132 may indicate one or more modifications to an initial prompt 104, such as a change in the tone or another prompt characteristic 110(1) associated the initial prompt 104, one or more changes to the prompt text 106(1) such as the addition of contextual information, one or more changes to the semantic information 108(1), and so forth. In some implementations, the prompt determination module 204 may be trained to generate prompts having diverse prompt text 106, semantic information 108, and prompt characteristics 110, independent of the modification determination 132.

The memory 518 may store the score determination module 210. The score determination module 210 may determine score data 212 based one or more generated prompts 206. The score determination module 210 may be trained to determine scores based on characteristics of generated prompts 206, such as fluency, consistency, coherence, tone, diversity, and so forth. The determined score data 212 may include a single score value or multiple score values each associated with a respective metric of a prompt.

The memory 518 may also store the rationale determination module 216. The rationale determination module 216 may determine rationale data 218 that represents rationales for determination of a prompt score 214 with regard to a corresponding generated prompt 206. For example, the rationale determination module 216 may be trained to determine a rationale associated with a generated prompt 206 and corresponding prompt score 214 using training data that associates rationales with corresponding sets of scores and characteristics of prompts. Continuing the example, rationale data 218 may be determined based in part on correlations between characteristics of prompts and scores associated with the prompts.

The memory 518 may additionally store the constraint module 310. The constraint module 310 may determine correspondence between response outputs 304 of a language model 302 and constraint data 308 that represents one or more constraints associated with outputs of the language model 302. For example, the constraint module 310 may determine a set of determined prompts 312 that deviate from one or more constraints represented by the constraint data 308. In other implementations, the constraint data 308 may represent one or more sets of characteristics of a response output 304 or generated prompt 206 other than a constraint associated with the language model 302, and the constraint module 310 may be configured to determine a set of determined prompts 312 that are associated with those characteristics, or deviate from those characteristics.

The memory may store the prompt characteristics module 314. The prompt characteristics module 314 may determine characteristics, or combinations of characteristics, that occur in a set of determined prompts 312 that cause a language model 302 to deviate from a constraint, or that conform to another set of characteristics. In some implementations, the prompt characteristics module 314 may use one or more clustering algorithms to determine sets of prompts having identical or similar characteristics.

The memory may also store the output determination module 130. The output determination module 130 may determine outputs based on data associated with a machine learning model. In some cases, the determined outputs may be used as inputs for other machine learning models. For example, the output determination module 130 may determine a modification determination 132 based on reward data 126 associated with a learning model 102, context data 208 based on determined scores and rationales associated with a prompt generation model 202, output data 318 for use with a language model 302, and so forth.

Other modules 526 may also be present in the memory 518. For example, other modules 526 may include permission or authorization modules for modifying data associated with the computing device 502. Other modules 526 may also include encryption modules to encrypt and decrypt communications between computing devices 502, authentication modules to authenticate communications sent or received by computing devices 502, and so forth. Other modules 526 may include modules for training machine learning models, or generating or modifying training data. Other modules 526 may also include modules for analyzing or processing text data, for generating text data based on audio data, video data, image data, or other types of data, and so forth. Other modules 526 may include user interface modules for receiving user input, such as training data, prompts, constraints, and so forth.

Other data 528 within the data store(s) 522 may include configurations, settings, preferences, and default or threshold values associated with computing devices 502, style or layout data for generation of interfaces, and so forth. Other data 528 may include training data for training machine learning models, text data that may be used by a machine learning model when determining an output, parameter data associated with one or more machine learning models, and so forth. Other data 528 may also include encryption keys and schema, access credentials, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
- one or more non-transitory memories storing computer-executable instructions; and
- one or more hardware processors to execute the computer-executable instructions to:
  - access a first prompt comprising first text;
  - use a first machine learning model to determine a modification to the first prompt, wherein the first machine learning model comprises a model-free reinforcement algorithm that includes a reward function for determining a reward value based on:
    - a first state comprising the first text,
    - an action comprising the modification to the first prompt, a second state comprising second text based on the first text and the modification to the first prompt, and one or more intervals of time;

wherein the reward value is associated with a probability of a first response associated with the second text deviating from one or more constraints associated with a second machine learning model, and wherein the first machine learning model is trained to maximize the reward value by determining modifications to prompts that are associated with generation, by the second machine learning model, of responses having characteristics associated with an invalid response;

determine a second prompt based on the first prompt and the modification to the first prompt determined using first output from the first machine learning model, wherein the second prompt comprises the second text;

use the second machine learning model to determine the first response based on the second prompt, wherein the second machine learning model is trained to determine responses based on text and semantic information associated with prompts, wherein the responses are associated with the one or more constraints, and wherein the first response comprises third text that deviates from the one or more constraints; and determine an output based on the first response.

2. The system of claim 1, further comprising computer-executable instructions to:

use a third machine learning model to determine a score based on one or more characteristics of the second prompt and the first response, wherein the third machine learning model is trained to determine scores based on characteristics of text, and wherein the score is indicative of one or more semantic characteristics of one or more of the second text or the third text;

use a fourth machine learning model to determine a rationale associated with the score based on the first response and the score, wherein the fourth machine learning model is trained to determine rationales associated with determination of scores relative to first responses; and store the score and the rationale as data accessible to control generation of prompts for input to the second machine learning model.

3. A system comprising:

one or more non-transitory memories storing computer-executable instructions; and one or more hardware processors to execute the computer-executable instructions to:

use a first machine learning model to determine a first output based on a first prompt comprising first text, wherein the first machine learning model includes a reward function for determining a reward value based on one or more of:

a first state comprising the first text, an action comprising the first output, or a second state comprising second text;

wherein the reward value is associated with a probability of a response deviating from one or more constraints, and wherein the first machine learning model is trained to maximize the reward value by determining modifications to prompts associated with a first characteristic of responses to the prompts, and wherein the first output includes the second text indicative of a modification to the first prompt;

use a second machine learning model to determine a second prompt comprising third text based on the first prompt and the first output, wherein the second machine learning model is trained to generate prompts based on input prompts and text indicative of modifications; and use a third machine learning model to determine a second output comprising fourth text based on the second prompt, wherein the third machine learning model is trained to determine responses based on one or more of text or semantic information associated with prompts, wherein the responses are associated with one or more constraints.

4. The system of claim 3, further comprising computer-executable instructions to:

determine a relationship between the fourth text and the one or more constraints; and determine output data based on the relationship between the fourth text and the one or more constraints, wherein the output data is indicative of the fourth text deviating from the one or more constraints.

5. The system of claim 3, wherein the first machine learning model is trained to determine modifications that are associated with causing the third machine learning model to determine responses that deviate from the one or more constraints.

6. The system of claim 3, wherein:

the first machine learning model comprises a model-free reinforcement learning algorithm that includes the reward function, and the reward value is further based on one or more intervals of time.

7. The system of claim 3, further comprising computer-executable instructions to:

use a fourth machine learning model to determine a score based on the third text, wherein the fourth machine learning model is trained to determine scores based on one or more second characteristics associated with text; and store the score as data accessible to control generation of prompts for input to the third machine learning model.

8. The system of claim 3, further comprising computer-executable instructions to:

use a fourth machine learning model to determine a score based on the third text, wherein the fourth machine learning model is trained to determine scores based on one or more second characteristics associated with text;

use a fifth machine learning model to determine a rationale based on the score and the third text, wherein the fifth machine learning model is trained to determine rationales associated with determination of scores based on text and corresponding scores; and store an indication of the score and the rationale as data accessible to control generation of prompts for input to the third machine learning model.

9. The system of claim 3, further comprising computer-executable instructions to:

train the first machine learning model to determine modifications to prompts, wherein the modifications are associated with a first characteristic of responses to the prompts, using training data comprising a plurality of prompts, each prompt of the plurality of prompts associated with an indication of one of: the first characteristic or an absence of the first characteristic.

10. The system of claim 3, further comprising computer-executable instructions to:

determine the first prompt by:

providing a plurality of prompts to a fourth machine learning model, wherein the fourth machine learning model is trained to determine sets of prompts based on text and semantic information associated with prompts;

determining a first set of prompts associated with second characteristics and a second set of prompts associated with third characteristics, based on output from the fourth machine learning model; and using the first prompt as an input to the first machine learning model based on the first prompt being included in the first set of prompts.

11. The system of claim 3, wherein the reward value is determined based on the first state, the action, and the second state.

12. A system comprising:

one or more non-transitory memories storing computer-executable instructions; and one or more hardware processors to execute the computer-executable instructions to:

use a first machine learning model to determine a first output based on a first prompt comprising first text, wherein:

the first machine learning model includes a reward function for determining a reward value based on one or more of:

a first state comprising the first text, an action comprising the first output, or a second state comprising second text;

the reward value is associated with a probability of a response deviating from one or more constraints;

the first machine learning model is trained to maximize the reward value by determining prompts associated with a first characteristic of responses to the prompts, and the first output is determined based on the reward value, wherein the first output includes the second text indicative of a modification to the first text; and use a second machine learning model to determine a second prompt based on the first prompt and the first output, wherein the second prompt comprises third text.

13. The system of claim 12, wherein the first machine learning model is trained to determine modifications to prompts associated with responses, by a third machine learning model, that deviate from one or more constraints.

14. The system of claim 13, wherein:

the first machine learning model comprises a model-free reinforcement learning algorithm that includes the reward function, and the reward value is further determined based on:

one or more intervals of time.

15. The system of claim 13, further comprising computer-executable instructions to:

use the third machine learning model to determine a second output based on the second prompt, wherein the third machine learning model is trained to determine responses based on prompts, and wherein the responses are associated with the one or more constraints; and determine output data based on a relationship between the second output and the one or more constraints, wherein the output data is indicative of the second output deviating from the one or more constraints.

16. The system of claim 13, further comprising computer-executable instructions to:

use the third machine learning model to determine a second output based on the second prompt, wherein the third machine learning model is trained to determine responses based on prompts, and wherein the responses are associated with the one or more constraints.

17. The system of claim 16, further comprising computer-executable instructions to:

use a fourth machine learning model to determine a score based on the second output, wherein the fourth machine learning model is trained to determine scores based on one or more second characteristics associated with outputs; and store the score as data accessible to control generation of prompts for input to the third machine learning model.

18. The system of claim 16, further comprising computer-executable instructions to:

use a fourth machine learning model to determine a score based on the second output, wherein the fourth machine learning model is trained to determine scores based on one or more second characteristics associated with outputs; and use a fifth machine learning model to determine a rationale based on the score and the second output, wherein the fifth machine learning model is trained to determine rationales associated with determination of scores based on scores and corresponding outputs; and store an indication of the score and the rationale as data accessible to control generation of prompts for input to the third machine learning model.

19. The system of claim 12, further comprising computer-executable instructions to:

train the first machine learning model to determine modifications to prompts, wherein the modifications are associated with the first characteristic of responses to the prompts, using training data comprising a plurality of inputs, each input of the plurality of inputs associated with an indication of one of: the first characteristic or an absence of the first characteristic.

20. The system of claim 12, further comprising computer-executable instructions to:

determine the first prompt by:

providing a plurality of prompts to a third machine learning model, wherein the third machine learning model is trained to determine sets of inputs using a clustering algorithm that determines the sets of inputs based on characteristics of the inputs;

determining at least a first set of inputs associated with second characteristics and a second set of inputs associated with third characteristics, based on output from the third machine learning model; and determining the first prompt in response to the first input being included in the first set of inputs.

* * * * *